(No Model.)

E. C. ELLWOOD.
SEED DRILL.

No. 289,520.  Patented Dec. 4, 1883.

Witnesses
S. S. Williamson
P. M. Smith

Inventor
Everett C. Ellwood
By Worster Smith
Attys.

(No Model.)

E. C. ELLWOOD.
SEED DRILL.

No. 289,520.

3 Sheets—Sheet 2.

Patented Dec. 4, 1883.

Witnesses
S. S. Williamson
P. W. Smith

Inventor
Everett C. Ellwood
By Wooster Smith
Attys.

(No Model.)
E. C. ELLWOOD.
SEED DRILL.
No. 289,520.
3 Sheets—Sheet 3.
Patented Dec. 4, 1883.
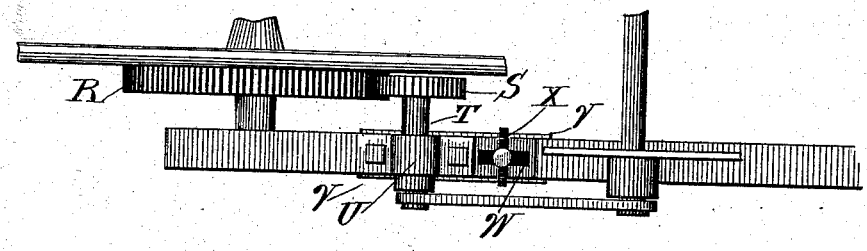
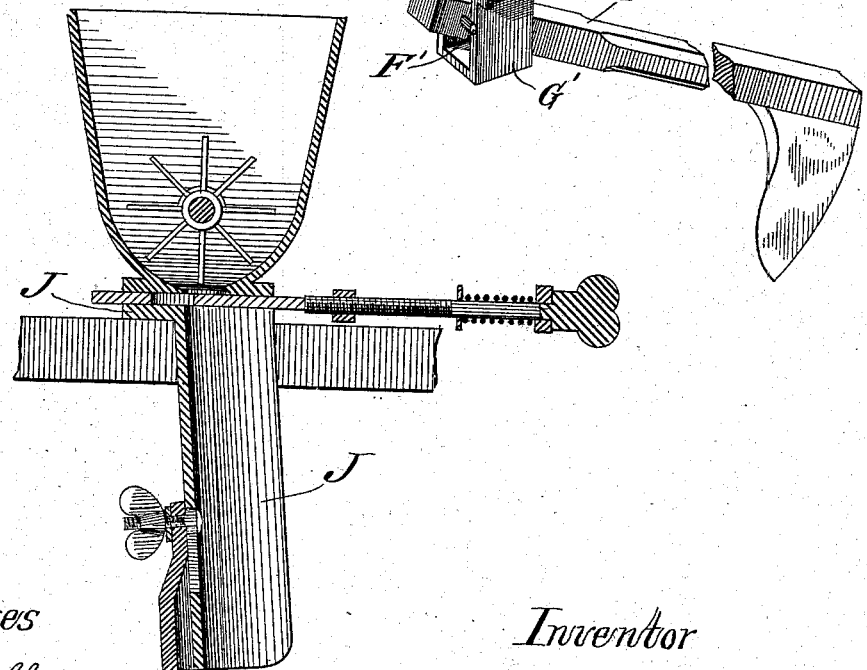

UNITED STATES PATENT OFFICE.

EVERETT C. ELLWOOD, OF GREEN'S FARMS, CONNECTICUT.

SEED-DRILL.

SPECIFICATION forming part of Letters Patent No. 289,520, dated December 4, 1883.

Application filed July 5, 1883. (No model.)

*To all whom it may concern:*

Be it known that I, EVERETT C. ELLWOOD, a citizen of the United States, residing at Green's Farms, in the county of Fairfield and State of Connecticut, have invented certain new and useful Improvements in Seed-Drills; and I do hereby declare the following to be a full, clear, and exact description of the invention, such as will enable others skilled in the art to which it appertains to make and use the same.

My invention relates to certain novel and useful improvements in devices known as "seed-drills," and has for its object to provide a machine for sowing seeds of various sizes by a simple and ready adjustment which varies the seed-aperture; also, to agitate the seeds and prevent clogging by positive and constant means; and with these ends in view my invention consists in the details of construction and combination of elements hereinafter fully and in detail explained, and then specifically designated by the claims.

In order that those skilled in the art to which my invention appertains may more fully understand its construction and operation, I will proceed to describe the same in detail, referring by letter to the accompanying drawings, forming part of this specification, in which—

Figure 1:
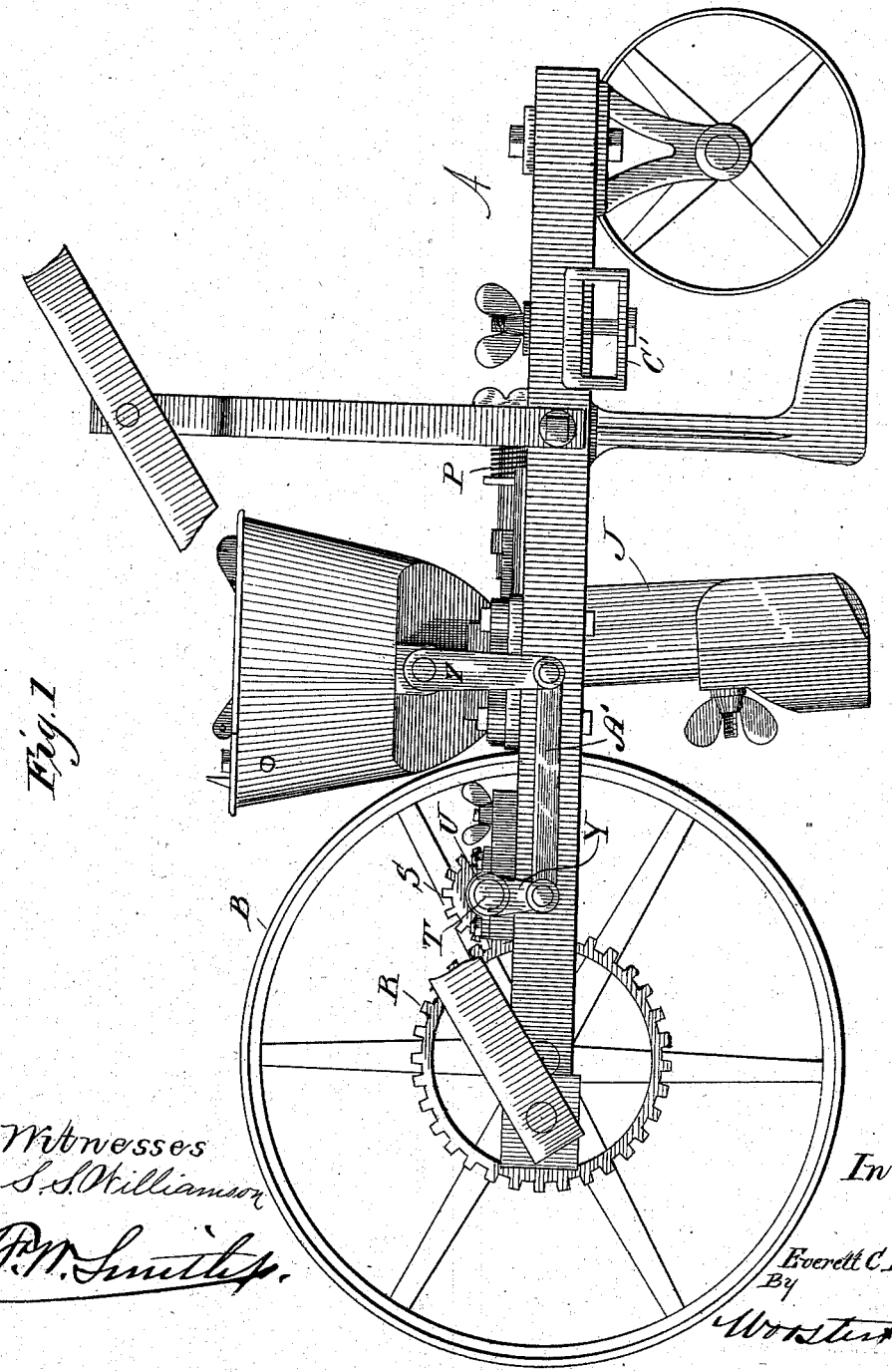
Figure 2:
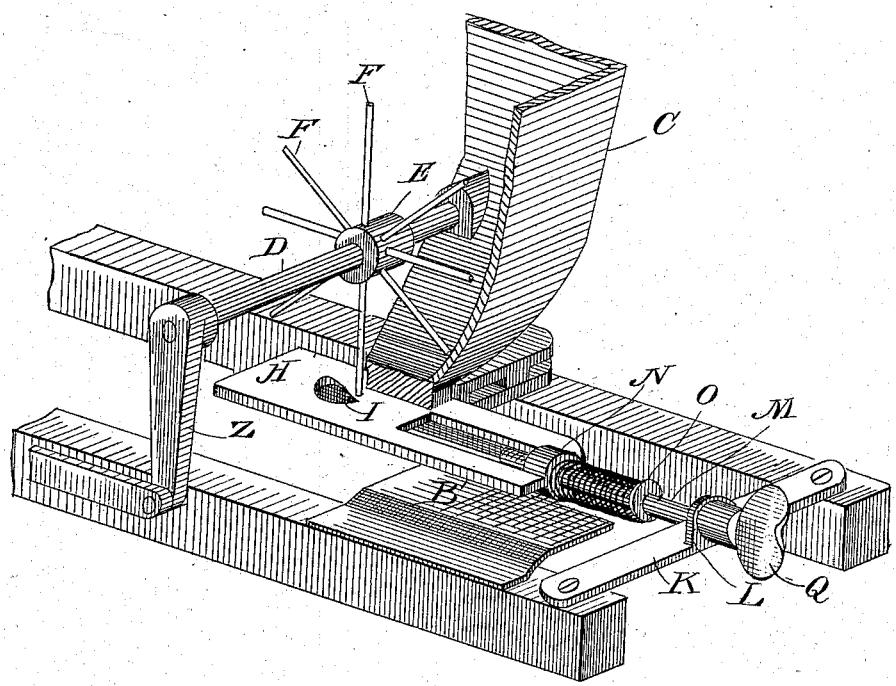
Figure 3:
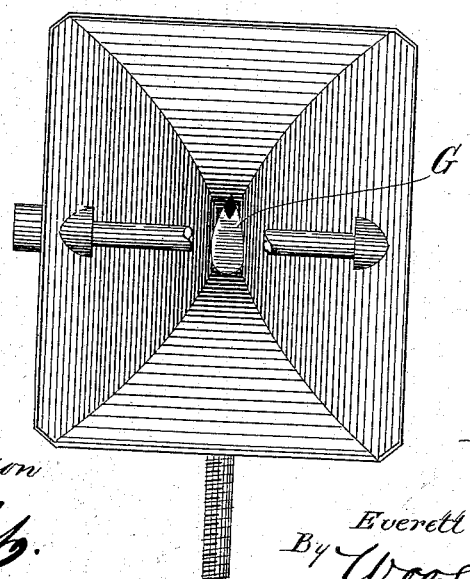

Figure 1 is a side elevation of my improvement; Fig. 2, a detail perspective with the hopper broken away, showing the seed-agitator and the aperture-regulator; Fig. 3, a plan view, showing the interior of the hopper and the seed-aperture, and with the agitator broken entirely away; Fig. 4, a plan view of the mechanism which operates the agitator; Fig. 5, a central vertical longitudinal section through the hopper and mechanism which operates to vary the seed-aperture, and showing the function of the agitator and the relative position of said mechanism, and the opening in the bottom of the hopper; and Fig. 6, a perspective view of one of the markers.

Similar letters denote like parts in the several figures of the drawings.

A is the frame of the machine, and pivoted at the forward end thereof is the carriage-wheel B.

C is the hopper, secured to the frame, and D a rock-shaft extending laterally through said hopper. Secured on this shaft, and within the hopper, is a hub, E, with spokes F, and directly under the field of action of said spokes is an opening, G, in the bottom of the hopper. Immediately underneath this opening is a plate, H, with opening I therein. This plate is confined against lateral play by the lower portion of the hopper, and it is supported between the upper portion of the share J and the hopper, as clearly shown at Fig. 5.

K is a cross-bar with upwardly-projecting lug L. Through the latter is passed a rod, M, threaded at its inner end, and operated within a threaded bearing, N, at the rear end of the plate H.

O is a collar rigidly secured on the rod, and between this collar and the lug L is a spring, P, which serves to confine the rod against motion in the direction of its length. The thread of this rod is of a nature opposite to that in the bearing N, so that by manipulating the thumb-piece Q, secured to said rod, the plate H will be moved forward or backward, as the case may be.

Within the carriage-wheel B, and concentrically cast with or secured to the spokes of said wheel, is a gear-wheel, R.

S is also a gear-wheel arranged on a shaft, T, whose bearing is in the block U. This block is confined laterally between flanges V on the frame of the machine, and has an elongated slot, W, through which is placed a set-screw, X. This wheel S is in gear with the wheel R when the machine is in operation, as shown at Figs. 1 and 4. The wheels are thrown out of gear by loosening the set-screw X and sliding the block U backward.

Y is a crank-lever secured to the shaft T, and Z is the lever projection of the rock-shaft D. These two shafts are pivotally connected to a rod, A', the crank Y being shorter than the lever Z. As the carriage-wheel B revolves, a similar motion will be imparted to the wheel S, and the lever Z and agitator-spokes F will thereby have a rocking motion. Should it become desirable to enlarge the seed-aperture, this may readily be accomplished by moving the plate H backward, and the opening I in the latter is of such a shape that the farther back the plate is moved the larger becomes the seed-aperture. By placing a graduated scale on the platform B', as shown at Fig. 2, the seed-aperture may be readily and uniformly adjusted at all times. C' are blocks within which are clamped the supports D' for the furrow-markers E. These latter are provided with pin projections F' on each side, which serve to keep said markers within the box G', and at the same time allow a pivotal motion to make allowance for irregular surfaces.

By the use of my improvement the flow of seed is always constant, and the adjustment of the seed-aperture is a great convenience and advantage, as very little time is consumed in adapting my improvement for any sized seed.

Having thus described my invention, what I claim as new, and desire to secure by Letters Patent, is—

1. The combination of the cross-bar K, having lug L, rod M, plate H, with aperture I, and with screw-threaded bearing N at its rear end, and hopper C, open at the bottom, substantially as set forth.

2. The combination of the sliding plate H, operated as described, with the gage-plate B', secured to the frame of the machine, as set forth.

3. The furrow-markers E', having at their inner extremities pin projections F, in combination with the boxes G', secured to the supports D', whereby said markers may be detachably secured within the boxes, substantially as shown and described.

In testimony whereof I affix my signature in presence of two witnesses.

EVERETT C. ELLWOOD.

Witnesses:
F. W. SMITH, Jr.,
S. S. WILLIAMSON.